United States Patent
Kawamura et al.

(10) Patent No.: US 7,554,782 B2
(45) Date of Patent: Jun. 30, 2009

(54) SAFETY PLC

(75) Inventors: Makoto Kawamura, Chiryu (JP); Kuniyuki Niwa, Kariya (JP); Sutemaro Kato, Kariya (JP); Michael Niehaus, Florstadt (DE)

(73) Assignee: JTEKT Corporation, Osaka-shi (JP)

( * ) Notice: Subject to any disclaimer, the term of this patent is extended or adjusted under 35 U.S.C. 154(b) by 113 days.

(21) Appl. No.: 11/493,827

(22) Filed: Jul. 27, 2006

(65) Prior Publication Data

US 2007/0052299 A1    Mar. 8, 2007

(30) Foreign Application Priority Data

Jul. 29, 2005    (JP) ............... 2005-222039

(51) Int. Cl.
*H02H 3/20* (2006.01)

(52) U.S. Cl. .................................. 361/91.6

(58) Field of Classification Search ............... 361/91.1, 361/91.6
See application file for complete search history.

(56) References Cited

U.S. PATENT DOCUMENTS

| | | | | |
|---|---|---|---|---|
| 6,924,533 B2 * | 8/2005 | Takemura et al. | ........... | 257/355 |
| 6,968,283 B2 * | 11/2005 | Matsumura et al. | ......... | 702/100 |
| 7,061,738 B2 * | 6/2006 | Fey et al. | .................... | 361/91.6 |
| 2004/0080880 A1 | 4/2004 | Yang et al. | | |
| 2007/0274013 A1 * | 11/2007 | Gschossmann et al. | ....... | 361/86 |

FOREIGN PATENT DOCUMENTS

| | | |
|---|---|---|
| FR | 2 741 756 | 5/1997 |
| JP | 2002-358106 | 12/2002 |

* cited by examiner

*Primary Examiner*—Stephen W Jackson
*Assistant Examiner*—Christopher J Clark
(74) *Attorney, Agent, or Firm*—Oblon, Spivak, McClelland, Maier & Neustadt, P.C.

(57) ABSTRACT

A safety PLC having duplex power supply circuits, includes: a first output-stage transistor; a first DC power supply that drives the first output-stage transistor; a second output-stage transistor; a second DC power supply that drives the second output-stage transistor; a signal transfer path that includes a resistor and connect the first output-stage transistor to the second output-stage transistor; and a pair of overvoltage protection units, each of which is disposed between a pair of output terminals of the corresponding one of the first and second DC power supplies and restricts the maximum value of an output potential difference between the pair of output terminals.

1 Claim, 5 Drawing Sheets

SAFETY PLC

BACKGROUND OF THE INVENTION

The present invention relates to a safety PLC having duplex power supply circuits.

In recent years, PLCs (safety PLCs) that have duplex hardware or software configurations to improve reliability have come into widespread use. An example of the safety PLC is disclosed in the following Patent Document 1.

FIG. 5 shows an example of the hardware configuration of a safety PLC according to the related art. FIG. 5 shows systems X and Y and a signal transfer path provided between the systems X and Y. The systems X and Y realize a duplex system in a single safety PLC. The systems X and Y are supplied with power from DC power supplies of different systems. Therefore, for example, in a case in which a short circuit occurs in a power supply circuit for supplying power to the system Y and thus a DC voltage of 24V is applied to the signal transfer path, if the resistance value of a resistor $R_o$ included in the signal transfer path is set to 12 kΩ or more, the current flowing through a transistor Tra included in the system X can be kept smaller than or equal to 2 mA.

In the safety PLC according to the related art, generally, a wiring line provided with a resistor having a resistance value of, for example, about 10 KΩ is used in the signal transfer path between the above-mentioned systems X and Y. In other words, according to the related art, when a wiring line provided with the resistor $R_o$ with a high resistance value is used in the signal transfer path connecting the systems, even if a power supply circuit of one of two systems (for example, the system Y) fails, a circuit (for example, the transistor Tra) of the other system can be reliably protected.

Patent Document 1: JP-A-2002-358106

However, when a wiring line provided with a resistor having a high resistance value of about 10 KΩ or more is used in the signal transfer path connecting the systems X and Y, stray capacitance that is parasitic on the high-resistance circuit makes it difficult to raise the frequency of a digital signal (square wave) to be transmitted through the signal transfer path above that in the related art. This phenomenon occurs because the stray capacitance that is parasitic on the high-resistance circuit, such as an MELF resistor, serves as a low pass filter and thus the waveform of the digital signal (square wave) to be transmitted is distorted.

SUMMARY OF THE INVENTION

An object of the invention is to provide a safety PLC having duplex power supply circuits which can make the frequency of a digital signal to be transmitted through an internal signal transfer path higher than that in the related art.

According to an aspect of the invention, a safety PLC having duplex power supply circuits, comprises:
a first output-stage transistor;
a first DC power supply that drives the first output-stage transistor;
a second output-stage transistor;
a second DC power supply that drives the second output-stage transistor;
a signal transfer path that includes a resistor and connect the first output-stage transistor to the second output-stage transistor; and
a pair of overvoltage protection units, each of which is disposed between a pair of output terminals of the corresponding one of the first and second DC power supplies and restricts the maximum value of an output potential difference between the pair of output terminals.

The overvoltage protection unit may be formed of a known electronic component, such as a zener diode or an arrester.

In the safety PLC according to the above-mentioned aspect, the overvoltage protection unit may be composed of a zener diode connected between the two output terminals.

Further, in the safety PLC according to the above-mentioned aspect, the overvoltage protection unit may include: an NPN transistor that has a collector terminal connected to a high-potential-side terminal of the two output terminals and an emitter terminal connected to a low-potential-side terminal of the two output terminals; a zener diode that has a cathode terminal connected to the high-potential-side terminal and an anode terminal connected to a base terminal of the NPN transistor; and a resistor that connects the base terminal to the low-potential-side terminal.

According to the invention, the following effects are obtained.

According to an aspect of the invention, even though a high-resistance resistor is not included in the signal transfer path, the overvoltage protection unit prevents an overvoltage from being applied from a system having a failed DC power supply to another system, or an overcurrent from flowing from the system having the failed DC power supply toward another system.

Therefore, according to the aspect of the invention, it is possible to effectively reduce the resistance value of the resistor on the signal transfer path while protecting duplex systems. Further, in this case, the stray capacitance effectively decreases with the reduction in the resistance value.

As a result, according to the aspect of the invention, it is possible to easily realize a safety PLC that can make the frequency of a digital signal to be transmitted through the signal transfer path higher than that in the related art.

Further, the overvoltage protection unit can be formed by connecting the zener diode between the output terminals (electrodes) of each power supply. Therefore, it is possible to simplify the construction of the safety PLC and to reduce the manufacturing cost.

Furthermore, the base terminal of the NPN transistor is connected to the anode terminal of the zener diode. Therefore, when a DC voltage output from the DC power supply exceeds the zener voltage of the zener diode, the collector current flowing through the NPN transistor rapidly increases with the rise of the DC voltage. Thus, it is possible to reliably and effectively keep the DC voltage output from the DC power supply in the rated value range.

DETAILED DESCRIPTION OF PREFERRED EMBODIMENTS

Figure 1:
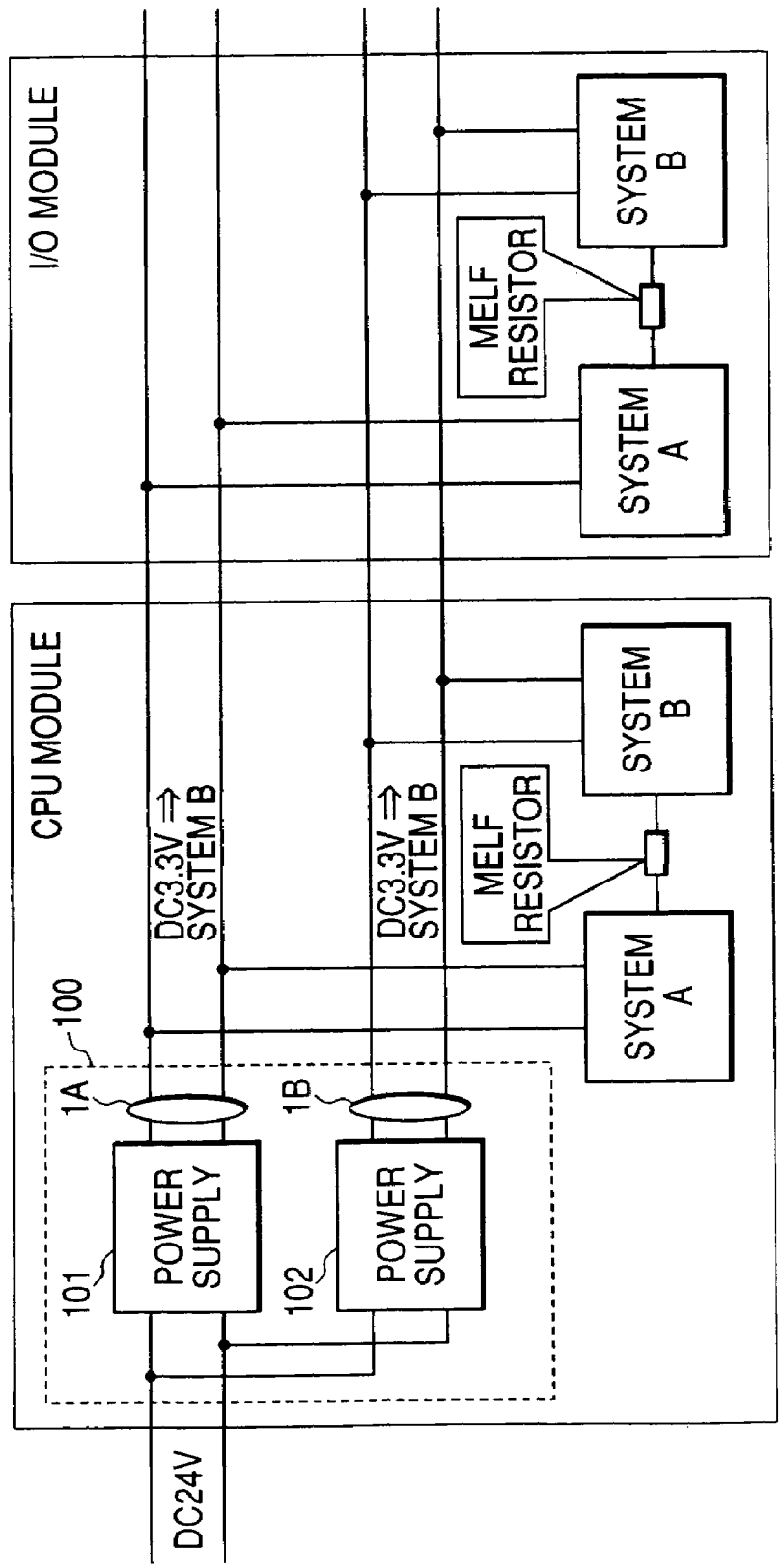
FIG. 1 is a view showing the construction of a safety PLC according to a first embodiment.

FIG. 1 is a view showing an example of the structure of a safety PLC according to an embodiment of the invention. The safety PLC uses a connection configuration in which an I/O module is connected to a CPU module in a line. A system A is connected to a DC power supply 101, and a system B is connected to a DC power supply 102. This duplex hardware configuration improves the reliability of the safety PLC including a power supply circuit. A portion represented by reference numeral 1A, provided in a DC voltage output stage of the DC power supply 101, corresponds to an overvoltage protection unit according to the invention. Similarly, a portion represented by reference numeral 1B, provided in a DC voltage output stage of the DC power supply 102, corresponds to an overvoltage protection unit.

The invention exhibits remarkable effects in the safety PLC having the above-mentioned hardware structure.

Hereinafter, embodiments of the invention will be described in detail.

However, the invention is not limited to the following embodiments.

Embodiment

Figure 2:
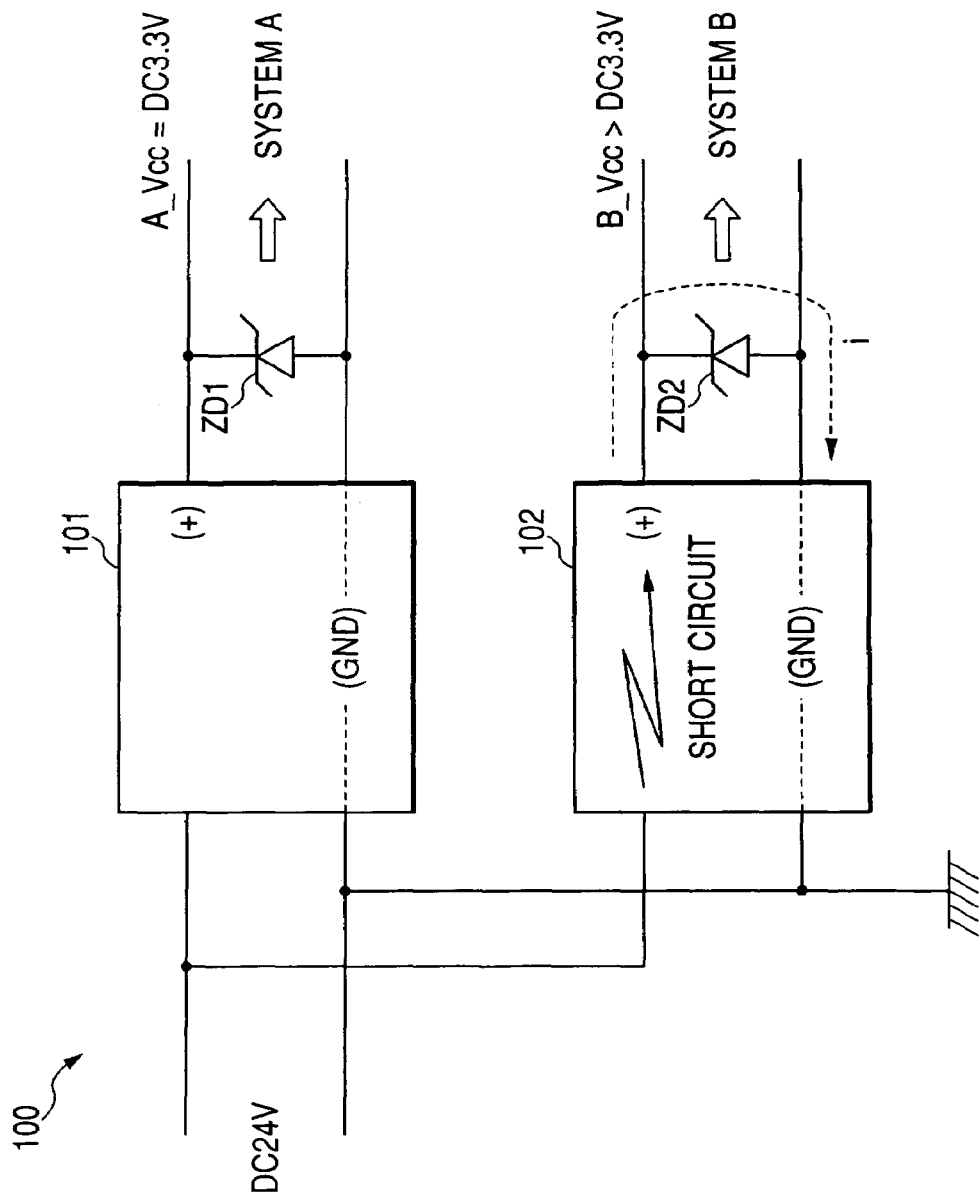
FIG. 2 is a circuit diagram of a power supply system 100 according to the first embodiment.

FIG. 2 is a circuit diagram of a power supply system 100 of a safety PLC according to an embodiment of the invention. The power supply system 100 is mounted on the safety PLC (FIG. 1), and mainly includes two devices, that is, the DC power supply 101 for the system A and the DC power supply 102 for the system B. The two DC power supplies are connected in parallel to an external DC power supply of 24V. The external DC power supply supplies power to the DC power supplies. A cathode terminal of a zener diode ZD1 corresponding to the overvoltage protection unit 1A of FIG. 1 is connected to one output terminal (positive electrode) of the DC power supply 101, and an anode terminal of the zener diode ZD1 is connected to the other terminal (earth) of the DC power supply 101. Similarly, a cathode terminal of a zener diode ZD2 corresponding to the overvoltage protection unit 1B of FIG. 1 is connected to one output terminal (positive electrode) of the DC power supply 102, and an anode terminal of the zener diode ZD2 is connected to the other terminal (earth) of the DC power supply 102. The zener voltage of each of the zener diodes ZD1 and ZD2 is 4.0 V.

Hereinafter, a DC output voltage of the DC power supply 101 is denoted by A_Vcc, and a DC output voltage of the DC power supply 102 is denoted by B_Vcc. In the safety PLC system according to the first embodiment, the rated values of the voltages A_Vcc and B_Vcc to be supplied to the systems A and B all are 3.3 V.

Here, it is considered that a short circuit occurs in the DC power supply 102. In this case, even though the DC output voltage B_Vcc of the DC power supply 102 is excessively higher than the rated value of 3.3 V, the DC voltage to be supplied to the system B is always kept at about 4.0 V or less by the zener diode ZD2. An overcurrent i generated at that time flows to the earth side of the DC power supply 102 through the zener diode ZD2 forming a detour.

Figure 3:
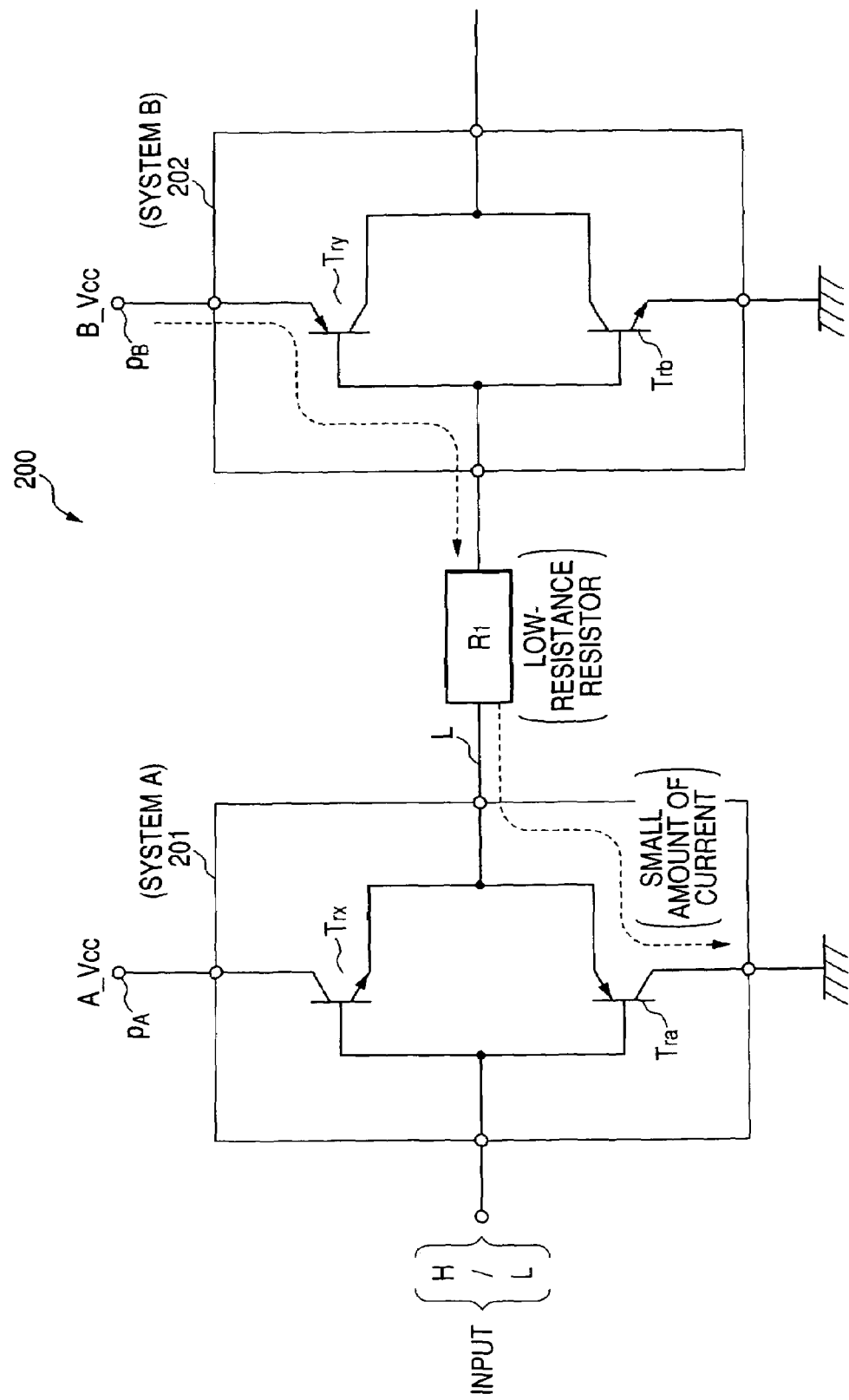
FIG. 3 is a circuit diagram of an information processing system 200 according to the first embodiment.

FIG. 3 is a circuit diagram of an information processing system 200 of the safety PLC system according to the first embodiment. The system A (circuit 201) and the system B (circuit 202) are connected to each other by a signal transfer path L including an MELF resistor $R_1$, and can communicate with each other through the signal transfer path L. A point $P_B$ is a feeding point through which power from the DC power supply 102 is supplied. The DC output voltage B_Vcc is always applied to the point $P_B$.

With the above-mentioned structure, even though the DC power supply 102 fails as described above, the DC output voltage B_Vcc of the DC power supply 102 is kept at a voltage of 4.0 V or less. Therefore, even though a rated current of an arithmetic circuit (for example, a transistor Tra) included in the system A (circuit 201) is 2 mA, the resistance of the MELF resistor $R_1$ can be set to a small value of 2 kΩ.

For example, when a low-level (low level: OFF instruction) input signal is input to the system A, a transistor Trx is turned off, and the transistor Tra is turned on. Therefore, the current flowing through the resistor $R_1$ in a left direction of FIG. 3, that is, the current flowing from the feeding point $P_B$, to which the DC output voltage B_Vcc is applied, toward the earth of the system A through a transistor Try, the resistor $R_1$, and the transistor Tra passes through the signal transfer path L.

However, in this case, when the DC output voltage B_Vcc is lower than or equal to 4.0 V, it is possible to keep a small amount of current even though the resistance value of the resistor $R_1$ included in the signal transfer path L is lowered to 2 kΩ. Therefore, the arithmetic circuit (for example, the transistor Tra) constituting the system A (circuit 201) can be always protected. At the same time, an arithmetic circuit (for example, a transistor Try) in the system B where a power failure occurs can also be protected.

For example, when a high-level (high level: ON instruction) input signal is input to the system A, the transistor Trx is turned on, and the transistor Tra is turned off. Therefore, the current flowing through the resistor $R_1$ in a right direction of FIG. 3, that is, the current flowing from a feeding point $P_A$, to which the DC output voltage A_Vcc is applied, toward the earth of the system B through a transistor Trx, the resistor $R_1$, and the transistor Trb passes through the signal transfer path L.

However, in this case, when the DC output voltage A_Vcc is lower than or equal to 4.0 V, it is possible to keep a small amount of current even though the resistance value of the resistor $R_1$ included in the signal transfer path L is lowered to 2 kΩ. Therefore, the arithmetic circuit (for example, the transistor Trb) constituting the system B (circuit 202) can be always protected. At the same time, an arithmetic circuit (for example, a transistor Trx) in the system A where a power failure occurs can also be protected.

With the structure according to the first embodiment, it is possible to remarkably reduce the resistance value of the resistor $R_1$ included in the signal transfer path L, as compared to the related art, and thus to remarkably reduce adverse effects caused by stray capacitance that is parasitic on a resistor circuit. Therefore, the configuration according to the first embodiment makes it possible to remarkably increase the frequency of a digital signal used for communication between the system A (circuit 201) and the system B (circuit 202), as compared to the related art, and thus to remarkably increase the communication speed.

The above-mentioned effects can be symmetrically obtained between the systems A and B, as described above, and are based on a fact that the zener diode ZD1 of FIG. 2 acts in the same way as the zener diode ZD2.

A mutual protection mechanism of circuits of the information processing system (PLC) is very useful in a safety PLC field in which systems using PLCs mutually monitor their safeties.

Modifications

The invention is not limited to the above-mentioned embodiment, but can be modified as follows. According to modifications and applications of the invention, the effects of the invention can also be obtained.

First Modification

For example, in the embodiment, the detour between one output terminal (positive electrode) and the other output terminal (earth) of the DC power supply 101 is formed of only the zener diode ZD1. However, various connection configurations may be used to make the detour.

Figure 4:
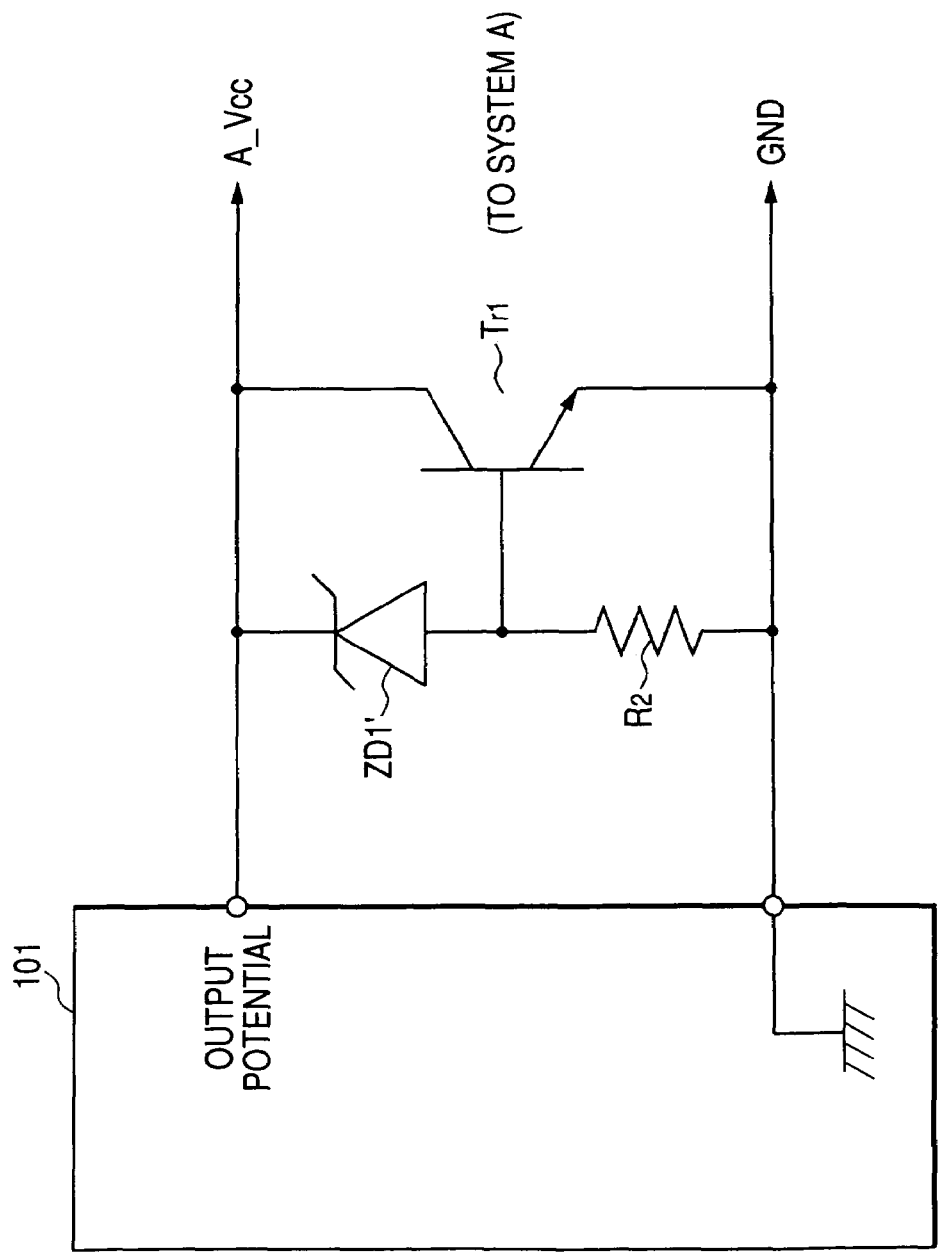
FIG. 4 is a circuit diagram illustrating a modification of the connection configuration of a zener diode ZD1.
Figure 5:
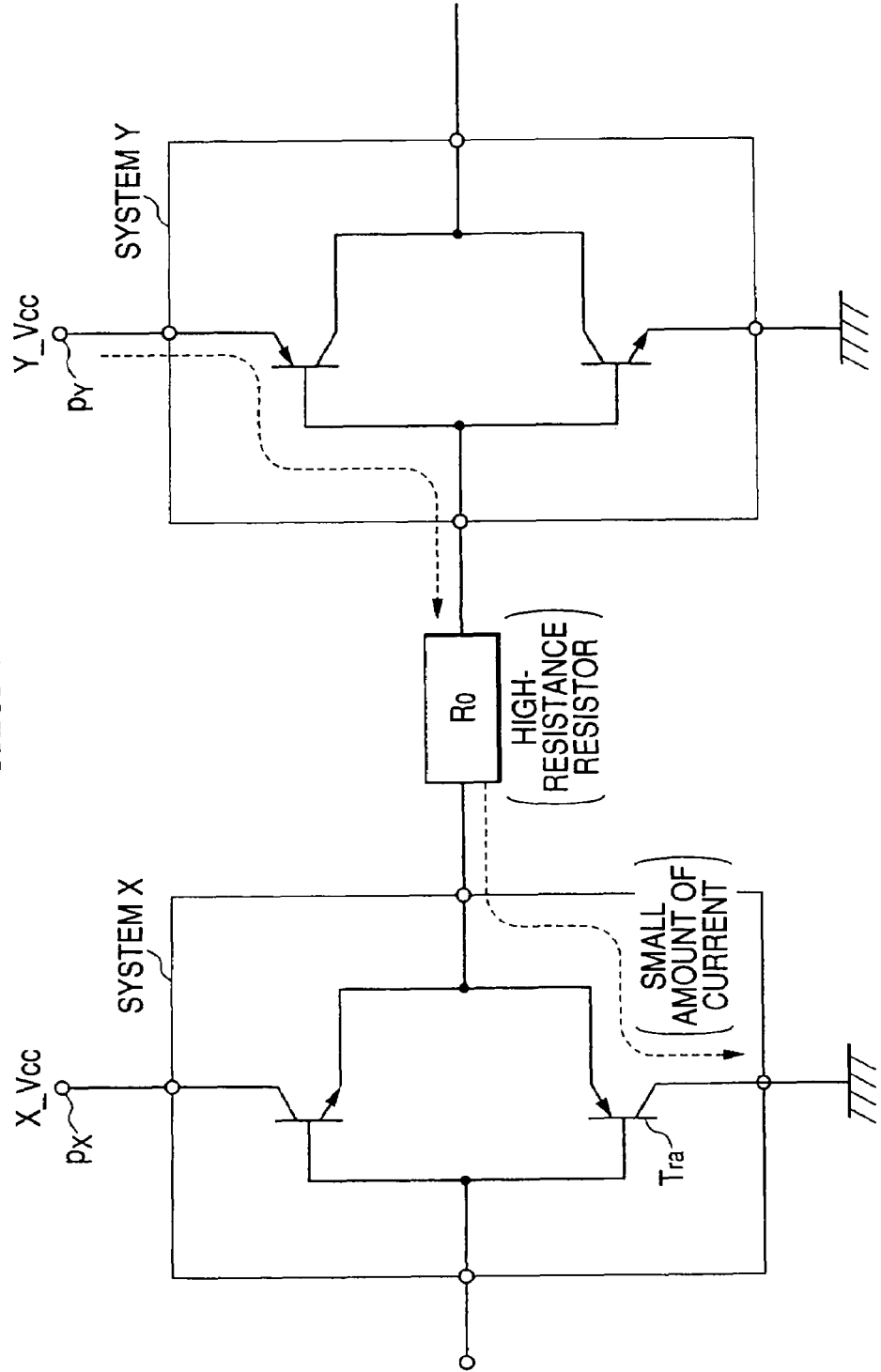
FIG. 5 is a view illustrating the construction and problems of a safety PLC according to the related art.

FIG. 4 shows a modification of the connection configuration of the zener diode ZD1 (FIG. 2). A cathode terminal of a zener diode ZD1' of FIG. 4 is connected to one output terminal (positive electrode) of the DC power supply 101, and an anode terminal of the zener diode ZD1' is connected to the other output terminal (negative electrode) of the DC power supply 101 through a resistor $R_2$. In other words, the zener diode ZD1' and the resistor $R_2$ are connected in series to each other between the two electrodes of the DC power supply 101.

Further, a collector terminal of an NPN transistor Tr1 is connected to the one output terminal (positive electrode) of the DC power supply 101, and an emitter terminal of the NPN transistor Tr1 is connected to the other output terminal (earth) of the DC power supply 101. Furthermore, a base terminal of the NPN transistor Tr1 is connected to the anode terminal of the zener diode ZD1'.

According to the above-mentioned construction, the base terminal of the NPN transistor Tr1 is connected to the anode terminal of the zener diode ZD1'. Therefore, when a DC voltage output from the DC power supply 101 exceeds the zener voltage of the zener diode ZD1', a collector current flowing through the NPN transistor Tr1 rapidly increases together with the rise of the DC voltage. As a result, the DC voltage output from the DC power supply 101 can be reliably and effectively maintained in the rated value range.

What is claimed is:

1. A safety PLC having duplex power supply circuits, comprising:
    a first output-stage transistor;
    a first DC power supply that supplies power to the first output-stage transistor;
    a second output-stage transistor;
    a second DC power supply that supplies power to the second output-stage transistor;
    a signal transfer path that includes a resistor and connects the first output-stage transistor to the second output-stage transistor; and
    a pair of overvoltage protection units, each of which is disposed between a pair of output terminals of the corresponding one of the first and second DC power supplies and restricts the maximum value of an output potential difference between the pair of output terminals, wherein the resistance value of the resistor is less than a resistance value required to protect the second output-stage transistor from an overcurrent in case of a short circuit in the first DC power supply in the absence of the overvoltage protection units,
    wherein each of the overvoltage protection units includes:
    an NPN transistor that has a collector terminal connected to a high-potential-side terminal of the pair of output terminals and an emitter terminal connected to a low-potential-side terminal of the pair of output terminals;
    a zener diode that has a cathode terminal connected to the high-potential-side terminal and an anode terminal connected to a base terminal of the NPN transistor; and
    a resistor that connects the base terminal to the low-potential-side terminal,
    whereby when a voltage difference between the high-potential-side terminal of the pair of output terminals and the low-potential-side terminal of the pair of output terminals reaches the breakdown voltage of the zener diode, current flows through the NPN transistor from the high-potential-side terminal to the low-potential-side terminal to restrict the maximum value of the output potential difference between the pair of output terminals.

* * * * *